Figure 1:
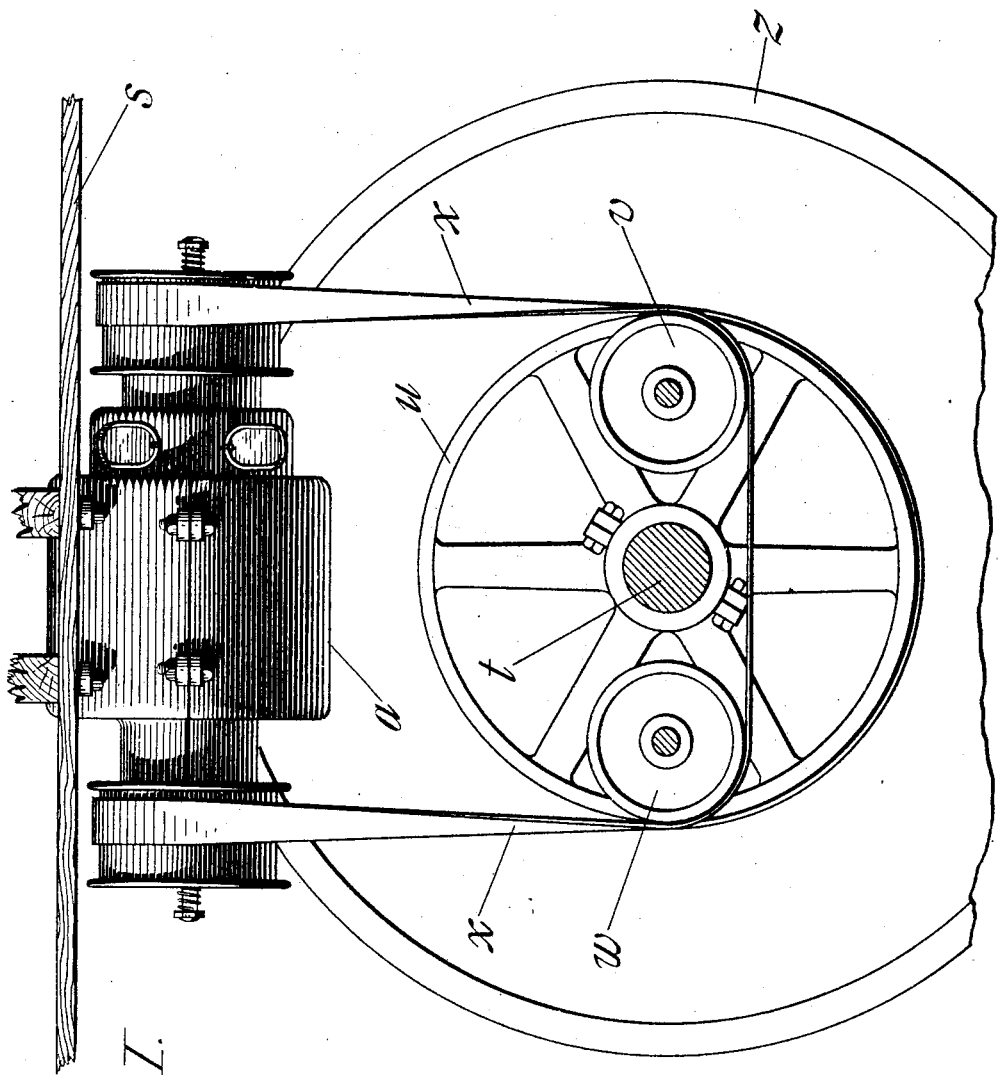

No. 709,848. Patented Sept. 23, 1902.
J. L. CREVELING.
COMBINED DYNAMO AND DRIVING GEAR.
(Application filed Nov. 18, 1901.)
(No Model.) 2 Sheets—Sheet 1.

WITNESSES:

INVENTOR.
BY
ATTORNEYS.

No. 709,848. Patented Sept. 23, 1902.
J. L. CREVELING.
COMBINED DYNAMO AND DRIVING GEAR.
(Application filed Nov. 18, 1901.)
(No Model.)
2 Sheets—Sheet 2.
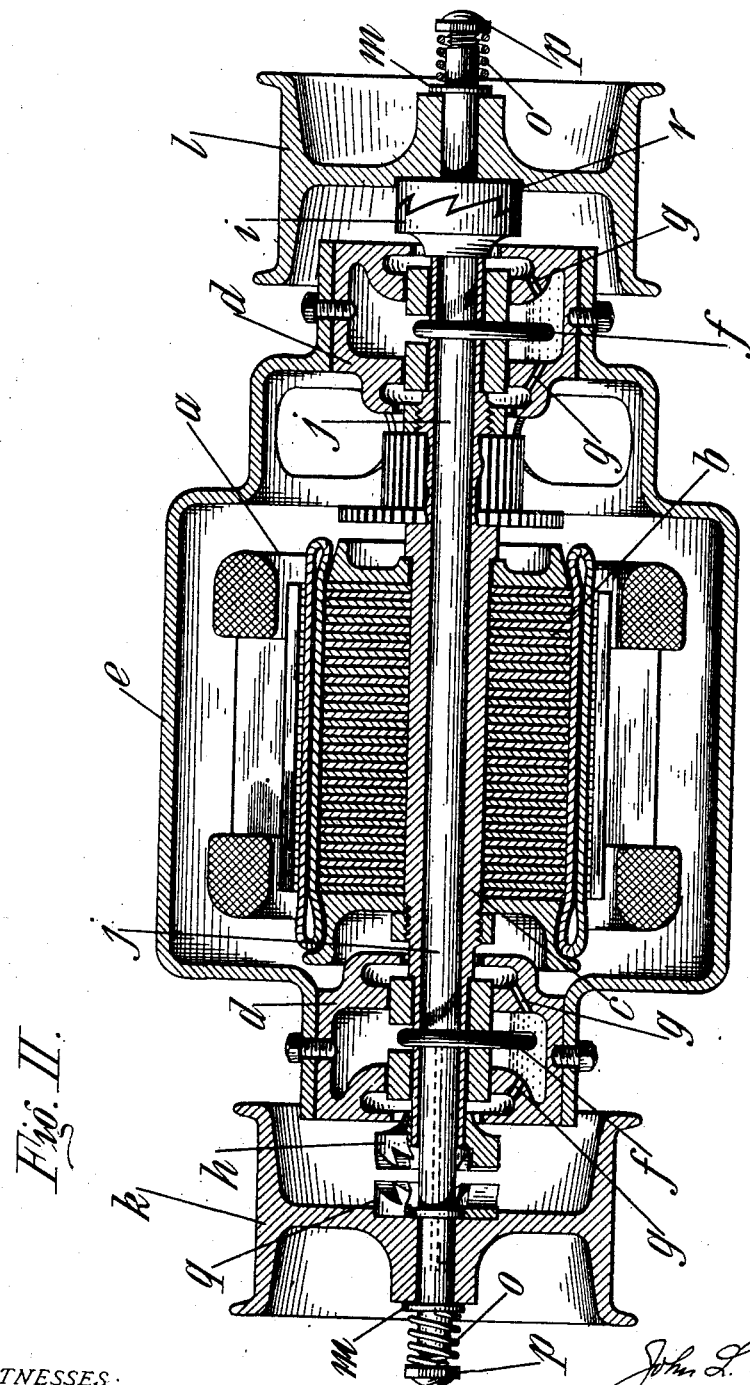
Fig. II.
WITNESSES:
INVENTOR.
BY
his ATTORNEYS

UNITED STATES PATENT OFFICE.

JOHN L. CREVELING, OF NEW YORK, N. Y.

COMBINED DYNAMO AND DRIVING-GEAR.

SPECIFICATION forming part of Letters Patent No. 709,848, dated September 23, 1902.

Application filed November 18, 1901. Serial No. 82,717. (No model.)

*To all whom it may concern:*

Be it known that I, JOHN L. CREVELING, a citizen of the United States, residing in the borough of Manhattan, city, county, and State of New York, have invented certain new and useful Improvements in a Combined Dynamo and Driving-Gear, of which the following is a specification.

My invention relates to a combined dynamo and driving-gear, and has reference more particularly to structures wherein the direction of rotation of the driving power of the machine is subject or liable to sudden reversals—as, for instance, a dynamo carried by a railway-car for the purpose of car-lighting, &c.

In order to clearly disclose one mode of carrying out my invention, I have illustrated the preferred embodiment thereof when the invention is employed in car-lighting, the same being, so far as I am at present advised, the best mode of carrying out my invention.

In the accompanying drawings, Figure I is a side elevation of a dynamo-machine and driving-gear embodying my invention as applied to car-lighting, and Fig. II is a transverse section through the machine.

In the drawings, $a$ is a suitable dynamo, the field frame or casing of which forms a suitable hanger or support for holding the machine in operative position and whose armature $b$ is carried upon a hollow shaft $c$, which hollow shaft runs in suitable bearings in boxes $d$, carried by the frame $e$ of the machine. Lubricating-rings $f$ of any desired construction are provided to lubricate the hollow shaft, and channels $g$ serve to return the surplus lubricant to the boxes $d$. A clutch member $h$ is carried at one end of the hollow shaft and a clutch member $i$ is carried at the other end of the hollow shaft.

Passing through the hollow shaft $c$ is a suitable shaft $j$, which shaft $j$ carries loose pulleys $k$ and $l$. These pulleys rotate free of the shaft, but are adapted to move longitudinally therewith. Washers $m$, surrounding the shaft and adapted to bear against the respective pulleys, are adapted to receive the thrust of the spiral springs $o$, held in place by the heads $p$ on the ends of the shaft, the purpose of which flexible mounting will be explained hereinafter. The pulley $k$ carries the mate $q$ of the clutch member $h$ and the pulley $l$ carries the mate $r$ of the clutch $i$. The dynamo is supported from the body $s$ of a railway-car, one of whose axles $t$ is provided with a suitable pulley $u$, adjacent to which are idler-sheaves $v$ $w$, extending below the said axle.

A belt or other equivalent driving-band is provided for driving the machine. This belt passes around both of the end pulleys of the shaft and the pulley $u$ and idlers $v$ $w$.

$z$ indicates the car-wheel.

The operation of the construction is as follows: When the machine is driven, as by a forward movement of the train, one of the clutches—say $i\ r$—will be in action and the other of the clutches, $h\ q$, will be out of action. So long as the direction of movement is not reversed the clutch $i\ r$ will remain in engagement irrespective of the stops which may be made; but upon a reversal of the movement of the train the belt $x$ will move in a reversed direction, thereby causing the face of the teeth of the clutch $r$ to bear strongly against the face of the teeth of the clutch $i$, imparting a longitudinal movement to the pulley $l$ and shaft $j$ sufficient to cause the teeth of the clutch $h\ q$ to engage each other, whereupon by reason of the shape of the teeth the clutch $h\ q$ will go into action and the clutch $i\ r$ will be disengaged and out of action, and the pulley $k$ will carry the load and the pulley $l$ run idly. Upon another reversal of movement of the train the opposite effect will be produced and the clutch $i\ r$ will come into action.

Having described my invention, what I claim, and desire to secure by Letters Patent, is—

1. The combination of a generator, a source of power whose motion is liable to reversals, a driving-gear intervening between the source of power and the generator and embodying in its structure clutch mechanism and coöperating pulleys placed on opposite sides of the armature adapted to communicate motion in one direction only to the generator, irrespective of the reversals of the direction of movement of the source of power.

2. The combination of a generator, a source of power whose direction of motion is liable to reversals and clutch mechanism and cooperating pulleys placed at opposite ends of the armature, adapted to communicate motion in one direction only to the generator, irrespective of the reversals in direction of movement of the source of power.

3. In a car system of distribution, the combination of a generator, a hanger therefor, pulleys and coöperating clutch members on each side of the hanger, a pulley driven from the axle of the car and an endless belt engaging all of said pulleys.

4. In a system of distribution for railway-cars, the combination of a generator, a hanger therefor, pulleys on either side of the car-axle and hanger and clutch members and coöperating means intervening between the pulleys, the clutch members of one pulley being entirely out of engagement when the clutch members of the other pulley are engaged.

5. The combination of a generator, provided with a shaft, a plurality of pulleys, a hollow shaft concentric with said shaft adapted to communicate motion to a movable part of the generator and clutch mechanism intervening between the pulleys and the hollow shaft.

6. The combination of a generator having a shaft, a plurality of clutches upon the said shaft, one on each side of the generator, and means whereby one of the clutches is entirely disengaged and the other is entirely engaged during the entire time it is in service or until a reversal of movement of the driving force.

7. The combination in a car-lighting system of a generator having a reversible source of power, a movable part, a plurality of shafts concentric with each other, a plurality of clutches each clutch having a member carried by one shaft and a plurality of pulleys each carrying a clutch member, said clutch mechanism being so connected to the generator as to communicate motion thereto in one direction only irrespective of the reversals of movement of the source of power.

8. The combination in a car-lighting system of a variable source of power, a generator comprising in its structure a rotary part and a shaft for driving the same, the said shaft being provided with pulleys one on each side of the said rotary part and clutches intervening between the said pulleys and the said rotary part, whereby the said rotary part is driven in one direction only.

9. The combination of a generator driven from a reversible source of power, a shaft, a plurality of pulleys concentric with the said shaft on opposite sides of the generator and a plurality of positively-engaging clutches adapted to communicate motion to the generator in one direction only irrespective of the reversals of direction of movement of the source of power.

10. A generator provided with a shaft combined with a plurality of pulleys concentric with said shaft one on each side of the generator and clutch members each clutch member coöperating with a mate forming a part of the driving-gear of the generator, the said clutch members being engaged one from the other by reciprocal action and one clutch member being entirely disengaged when the other is engaged.

11. The combination of a dynamo-frame constituting a shaft hanger or support and a shaft and a plurality of pulleys, one on each side of the dynamo-frame each adapted to drive the dynamo and means intervening between the pulleys whereby the pulleys may be driven in opposite direction.

12. In a system of distribution for railway-cars, the combination of a generator, a casing therefor serving as a hanger or support for the generator, and pulleys and coöperating clutches on either side of the same, each pulley open at one side to permit the application thereto of an endless belt passing around other pulleys without the necessity of opening or splicing the belt.

13. The combination of a generator, a dynamo-frame serving as a hanger or support therefor, driving-pulleys for the said generator on opposite sides thereof, and revolving in opposite directions, and a plurality of clutches, one clutch coöperating with each pulley and means whereby the movement of engagement of one clutch serves to effect the complete disengagement of the other clutch.

14. The combination with a car of a pulley deriving rotation from motion of the car of a generator having an armature and pulleys in proximity to the ends of the armature and clutch members transmitting motion from the pulleys to the armature in one direction only and an endless belt engaging all the above-named pulleys.

JOHN L. CREVELING.

Witnesses:
 HENRY W. KIRALFY,
 GEO. E. MORSE.